FREQUENCY TO VOLTAGE CONVERTING CIRCUIT

Filed July 11, 1961 2 Sheets-Sheet 1

INVENTOR.
BORIS STEFANOV
BILLY H. VINSON
BY Elliott & Pastoriza
ATTORNEYS

INVENTOR.
BORIS STEFANOV
BILLY H. VINSON
BY Elliott & Pastoriza
ATTORNEYS

United States Patent Office 3,099,800
Patented July 30, 1963

3,099,800
FREQUENCY TO VOLTAGE CONVERTING CIRCUIT

Billy H. Vinson, Santa Monica, and Boris Stefanov, Los Angeles, Calif., assignors to Kauke and Company, Inc., a corporation of California Filed July 11, 1961, Ser. No. 123,163
6 Claims. (Cl. 329—128)

Figure 1:
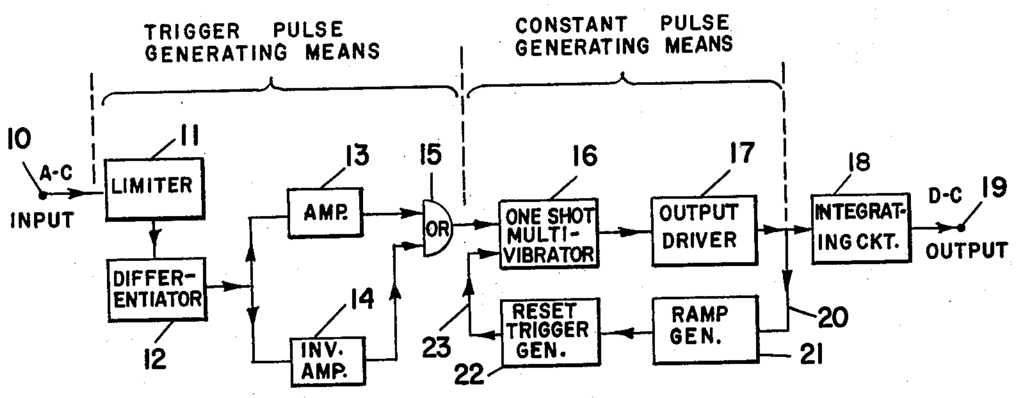

This invention relates generally to discriminators, and more particularly to an improved frequency to voltage conversion circuit for providing an output D.-C. voltage level directly proportional to the frequency of an A.-C. input signal.

There are two principal types of discriminating circuits for converting a frequency modulated signal into a varying voltage. The first type generally employs reactive elements whose impedance will change as a function of the frequency passed through the elements. A voltage change may then be derived from the element which will constitute a function of the frequency change of the input signal. Because of phase shift and similar problems, however, the linearity of the voltage change with frequency change cannot always be maintained over wide frequency bands. A second type of frequency modulation discriminator operates on a "digital" theory and may be made far more linear over wide frequency variations. In these latter types of circuits, the input frequency signal is converted into a series of volt-second area pulses. A simple integrating circuit is then employed to sum the number of pulses per unit time to provide an output voltage level which constitutes a function of the frequency of the input signal.

In the latter type of circuits, the major problem encountered is the provision of perfectly constant volt-second area pulses. Drift, temperature changes, and the like can change the value of the volt-second area pulses and thus result in an erroneous output signal. Also, a sufficiently short "fall" or cut-off time for each pulse has been difficult to achieve heretofore. In addition, it is extremely difficult to provide a constant volt-second area pulse in which the amplitude itself is rigidly clamped or fixed to certain values. Where Zener diodes are employed for this purpose, there may result some drift as a consequence of wide temperature variations or other factors affecting the accuracy of the Zeners.

Still another problem encountered with the use of summing or integrating circuits in the "digital" type frequency converters is the effect of distributed capacity in the integrating network itself. The distributed capacity can pass undesired portions of the signal which will appear in the output and decrease the signal to noise ratio of the entire system.

Aside from the foregoing problems, it is desirable that such system be as compact as possible, particularly where weight and space are at a premium in given installations. Towards this latter end, it is thus desirable to employ a transistorized circuit. Since transistors are temperature sensitive, suitable compensation is necessary.

With the above in mind, it is a primary object of this invention to provide a vastly improved frequency to voltage converting circuit in which the foregoing problems are overcome.

More particularly, it is an object to provide a frequency to voltage control circuit in which a high degree of linearity is achieved between the output voltage level and the input frequency over a wide frequency frange.

Another important object is to provide a circuit for converting a frequency to voltage which is adjustable so that a zero output voltage will correspond to a desired center frequency, a positive voltage will reflect an increase in frequency, and a negative voltage will reflect a decrease in frequency, the relationship being substantially absolutely linear through zero.

A particular object of this invention is to provide in a converting circuit improved means for generating constant volt-second area pulses which includes means providing an extremely fast switching for insuring accurate time duration for the pulse and means for compensating for any amplitude drift to the end that greatly improved constant volt-second area pulses can be provided over those generated by prior art circuits.

Another important object is to provide a novel capacitor compensating means to cancel the undesirable effects of distributed capacity in the summing or integrating circuit employed with the converter.

Still other various objects of the invention are to provide an improved frequency to voltage converter which is transistorized throughout to minimize its bulk and weight and which is compensated over a relatively wide temperature range.

Briefly, these and many other objects and advantages of this invention are attained by providing a trigger pulse generating means connected to receive the input A.-C. signal to be converted. This trigger pulse generating means provides a number of trigger pulses per second proportional to the input frequency. Also provided is a constant volt-second area pulse generating means connected to receive the trigger pulses and responsive to these pulses for providing a number of constant volt-second area pulses proportional thereto. Finally, there is provided an integrating means connected to the constant pulse generating means for integrating the constant volt-second area pulses to provide the desired D.-C. output signal.

In accordance with important features of this invention, the constant pulse generating means comprises a one-shot multi-vibrator for providing a square wave pulse in response to each of the trigger pulses. A suitable driver output means is connected to the one-shot multi-vibrator to receive the square wave pulse and define a constant amplitude therefor. A ramp generator in turn is connected to the output of the driver output means for generating a timing signal in response to such constant amplitude voltage. This timing signal cooperates with a reset trigger generating means connected to the one-shot multi-vibrator to pass a reset trigger pulse in response to the timing signal and thereby reset the multi-vibrator to define a constant time duration for the square wave pulse. The output of the driver means is also connected to the integrating means so that the constant amplitude voltage and constant time duration fix the amplitude and time duration of the square wave pulse from the one-shot multi-vibrator to define each of the referred to constant volt-second area pulses.

The design of the one-shot multi-vibrator circuit together with the ramp generator insures a greatly improved and substantially absolutely constant generation of the desired constant volt-second area pulses so that the desired increased accuracy of the entire system is insured.

The overall circuit includes suitable compensating elements for stability over wide temperature variations.

Figure 2:
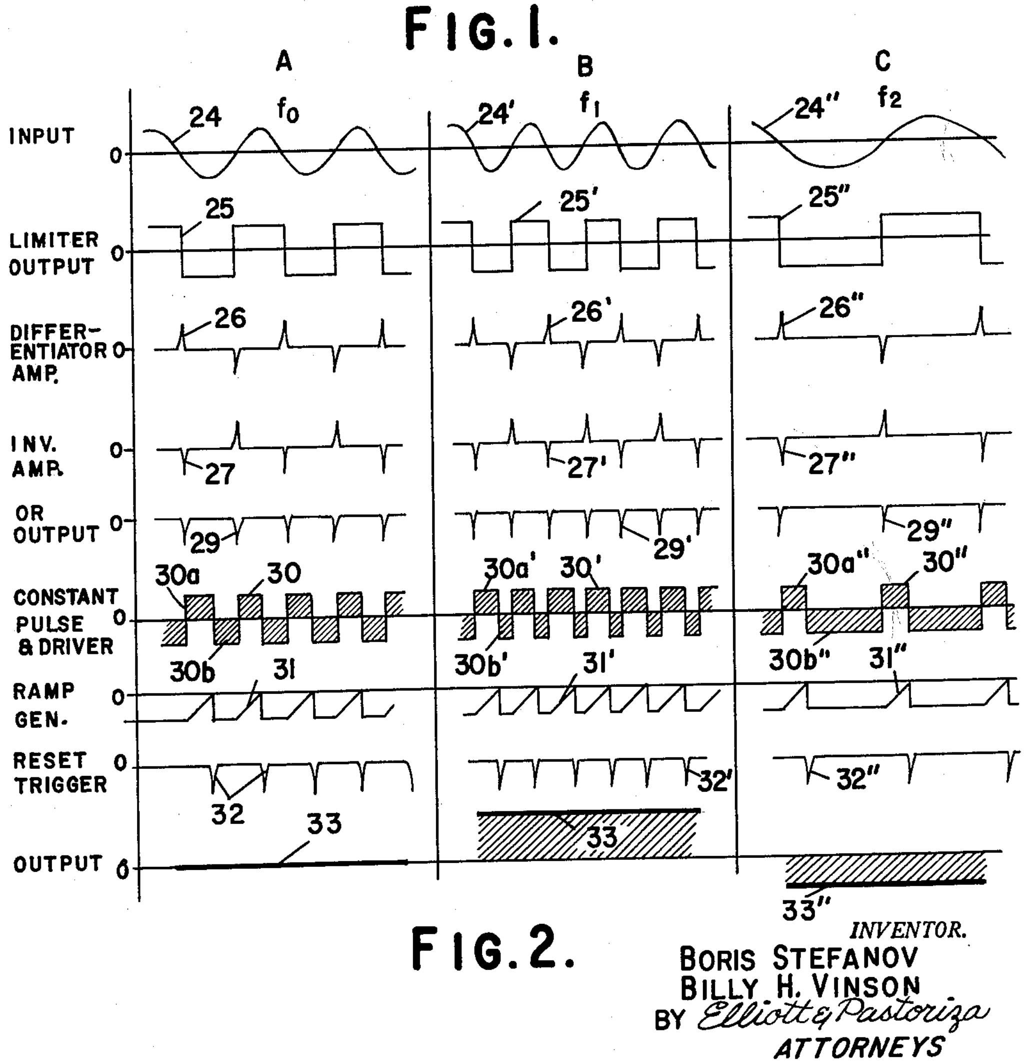
Figure 3:
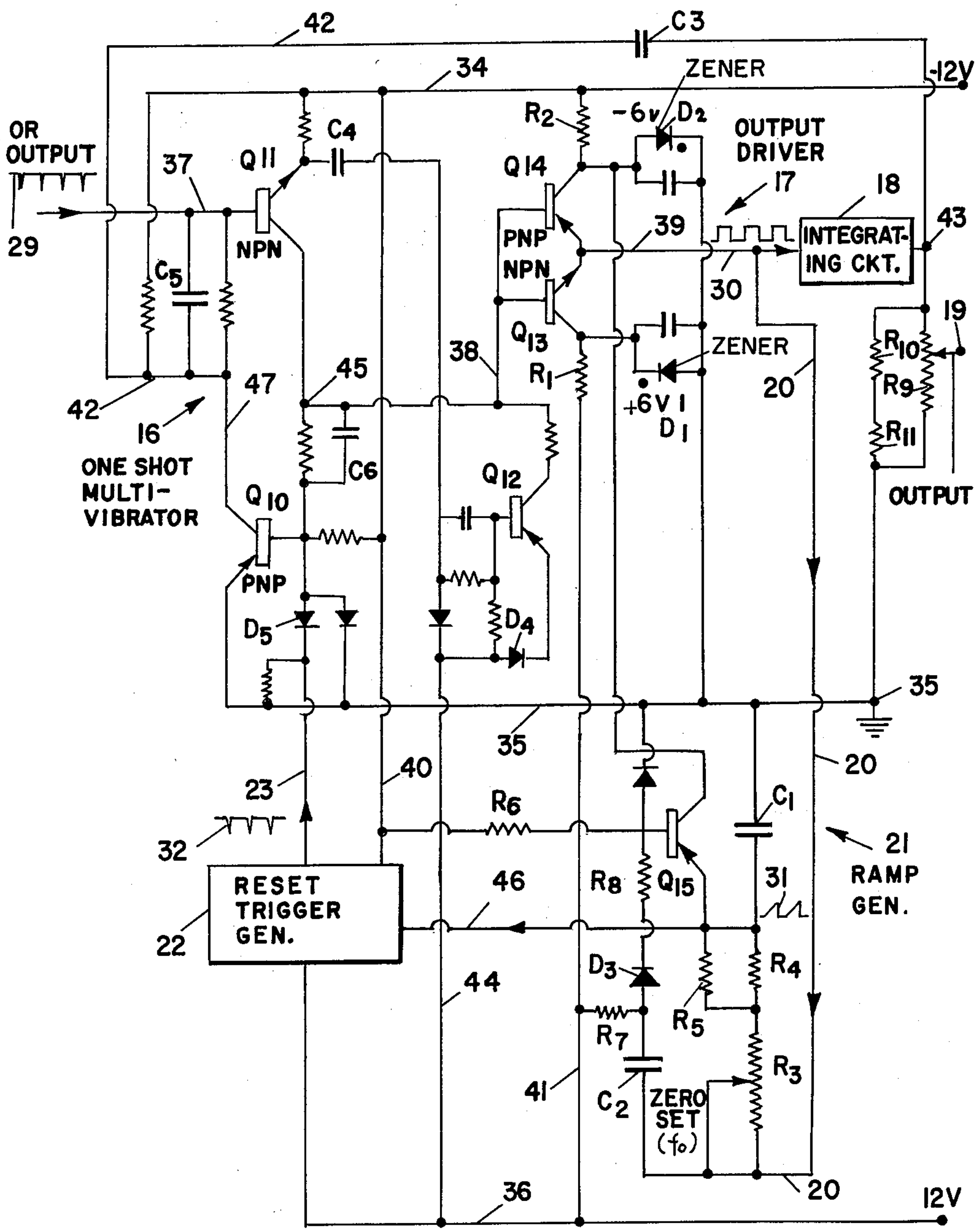

A better understanding of the invention and of the foregoing features and advantages will be had by now referring to a particular embodiment as illustrated in the accompanying drawings, in which:

FIGURE 1 is a block diagram of the frequency to voltage converting circuit in accordance with this invention;

FIGURE 2 sets forth a series of wave forms useful in explaining the operation of the various circuits represented by the blocks in FIGURE 1; and FIGURE 3 is a detailed circuit diagram illustrating particular features included within the constant pulse generating means illustrated in FIGURE 1.

Referring first to FIGURE 1, there is shown on input terminal 10 for receiving an A.-C. input signal of varying frequency. This signal may constitute a frequency modulated signal which is to be converted to a varying D.-C. voltage level in accordance with the particular changes in frequency. As shown, the input frequency signal is passed to a trigger pulse generating means which comprises a limiter 11, differentiator 12, amplifier 13, parallel connected inverting amplifier 14, and output "OR" circuit 15. These circuits serve to provide a number of negative trigger pulses per second which is directly proportional to the frequency of the input signal.

From the output of the "OR" circuit 15, the negative trigger pulses are fed to a constant pulse generating means comprising a one-shot multi-vibrator 16 connecting into an output driver 17. The output of the output driver 17 connects directly to an integrating circuit 18 providing an output D.-C. voltage level at the output terminal 19. The same output signal from the output driver 17 is passed through a lead 20 to a ramp generator 21 connected to a reset trigger generator 22 and through a line 23 back to the one-shot multi-vibrator 16.

The one-shot multi-vibrator 16 provides a square wave form in response to each of the negative trigger pulses received from the "OR" circuit 15. The output driver 17 essentially serves to fix the amplitude of these square wave pulses within rigid limits. This fixed amplitude in turn drives the ramp generator 21 which provides a timing signal. This timing signal cooperates with the reset trigger generator 22 so that a reset trigger is generated after a given time duration to terminate the square wave and reset the one-shot multi-vibrator. Thus, the output from the driver 17 constitutes a number of constant volt-second area pulses proportional to the frequency of the input signal.

The integrating circuit simply serves to sum the constant volt-second area pulses so that the D.-C. voltage level at the output 19 will vary linearly with variations in the frequency of the input signal.

A better understanding of the foregoing operation will be had by now referring to the series of wave forms illustrated in FIGURE 2.

Referring to the upper lefthand portion of FIGURE 2, there is illustrated an input signal in the form of a sine wave 24 having a given center frequency $f_0$. Also illustrated is an input signal 24' of higher frequency $f_1$ and an input signal 24'' of lower frequency $f_2$. The circuit is designed to provide a zero output voltage level for a given center frequency corresponding to $f_0$. If the frequency increases to a higher frequency such as $f_1$, the output will provide a positive voltage level proportional thereto, and if the frequency decreases to a value below the center requency such as $f_2$, there will be provided a negative output voltage proportional thereto. The three situations are depicted in the columns A, B, and C shown in FIGURE 2, and each of these situations will be individually discussed.

First with respect to the column A, the input sine wave 24 passes to the limiter 11 which may constitute an overdriven amplifier to provide a square wave 25. The square wave passes through the differentiator 12 of FIGURE 1 to provide a series of positive and negative pulses such as indicated at 26, these pulses or triggers being generated at each cross-over point of the square wave 25 with respect to the zero voltage line. The amplifier 13 simply amplifies the alternately positive and negative trigger signals 26 so that the output from the amplifier 13 is substantially the same as shown in the third wave form of FIGURE 2. The inverting amplifier 14 of FIGURE 1, however, receives the same positive and negative trigger signals and inverts them so that they appear as at 27 in the fourth or inverter amplifier output wave form shown in FIGURE 2.

The "OR" circuit 15 is biased to pass only negative triggers and will thus provide an output signal when a negative trigger is received either from the amplifier 13 or inverting amplifier 14. The output of the "OR" circuit therefore constitutes a number of negative trigger pulses such as shown at 29. As is evident, these negative trigger pulses will occur at each cross-over of the input sine wave 24 with respect to the zero voltage line and thus the number of negative trigger pulses 29 per second is equal to twice the input frequency and is thus directly proportional to the input frequency.

The output of the driver 17 in FIGURE 1 constitutes a number of constant volt-second area pulses shown at 30. These pulses are initiated by reception of each of the negative trigger pulses 29. The amplitude of these pulses is fixed to extend equally positively and negatively with respect to a zero center line. Their time duration in turn is fixed by suitable adjustable means in the ramp generator 21 such that their actual duration is equal to half the interval between successive trigger pulses 29 for a given input center frequency $f_0$. By this arrangement, it will be evident that the area of each constant volt-second pulse above the zero reference voltage line such as indicated at 30*a* is exactly equal to the area before the next successive constant volt-second area pulse below the voltage line indicated at 30*b*.

This time duration as stated heretofore is controlled by the ramp generator 21 and reset trigger generator 22. The output from the ramp generator 21 is illustrated by the saw-tooth wave forms 31 and the output from the reset trigger generator is in the form of negative reset triggers 32. The arrangement is such that the reset trigger generator compares the voltage of the output from the ramp generator 21 with a zero voltage or ground level and when these voltages are exactly equal, that is, when the ramp generator voltage reaches the zero voltage level, a reset trigger such as 32 is generated to reset the one-shot multivibrator and thereby terminate the constant volt-second area pulses 30. Adjustment of the time duration can be effected by simply changing the slope of the saw-tooth wave forms 31 shown in FIGURE 2.

The constant volt-second area pulses 30 from the output driver 17 are fed into the integrating circuit 18 as described in conjunction with FIGURE 1 and since the area above and below the zero voltage line is equal, the output D.-C. level will be zero as shown at 33 in FIGURE 2.

Referring now to the column B wherein a higher frequency input signal $f_1$ is provided, the input sine wave is shown at 24' and the corresponding squaring thereof by the limiter 11 is shown at 25'. The positive and negative trigger pulses 26' and inverted trigger pulses 27' are combined in the "OR" circuit 15 to provide a number of trigger pulses 29' corresponding to the increased frequency $f_1$.

As in the case for the trigger pulses 29, the trigger pulses 29' will initiate generation of each constant volt-second area pulse from the one-shot multi-vibrator 16 and output driver 17, these pulses being indicated at 30'. Since the pulses are of a constant volt-second area, they will be identical to the pulses 30 for the center frequency $f_0$. However, more of the volt-second area pulses will be generated per unit time than in the case for the frequency $f_0$ since the number of trigger pulses 29' per unit time is greater. It will be evident, therefore, that the area of the volt-second pulse above the zero voltage line indicated at 30*a'* is greater than the area before the next successive constant volt-second area pulse below the zero voltage line indicated at 30*b'*. Therefore, the integrating circuit will yield a net positive output voltage level as indicated at 33' in the last wave form of column B of FIGURE 2. The slope of the ramp generator output 31' is the same as the slope of the output signal 31 except that more saw tooths occur per unit time since there are more triggering pulses per unit time. Similarly, the reset trigger pulses 32' are the same as the reset trigger pulses 32 except that more will occur per unit time than before.

Referring now to the last column C, wherein the input frequency $f_2$ is lower than the center frequency $f_0$, there will again be generated a square wave 25″ by the limiter 11, the same being differentiated, amplified, and inverted as before and as shown by the wave forms 26″ and 27″. Output trigger pulses 29″ will be provided, the number thereof, however, being less than described heretofore because of the lower frequency.

Again the constant volt-second area pulses are of precisely the same amplitude and time duration. Therefore, the area of these pulses above the zero voltage line indicated at 30a″ is now considerably less than the area before the next successive constant volt-second area pulse below the voltage line as indicated at 30b″. Thus, summing of these constant volt-second area pulses in the integrating circuit 18 will result in a net negative output D.-C. voltage level as shown at 33″ which is proportional to the input frequency. Again, the slope of the ramp generator output voltage 31″ is the same as before except that fewer such saw-tooths per unit time are provided. Similarly, the reset trigger pulses 32″ are the same as before except more widely spaced.

It is to be noted in the circuit of FIGURE 1 as described heretofore that the output from the driver 17 in the form of the constant volt-second area pulses is connected to both the integrating circuit 18 and the ramp generator 21. The time duration provided by the ramp generator 21 and reset trigger generator 22 is controlled by the amplitude of the constant volt-second area pulses. The control is such that should this amplitude increase the time duration will be caused to decrease. Therefore, should any drift occur, there will still remain a constant overall area of the output pulses from the driver. The manner in which this compensation is realized will become clearer as the description proceeds.

The degree of linearity with which the output D.-C. voltage level will vary with changes in the input frequency is determined by the degree with which the area of the volt-second pulses 30, 30′, and 30″ shown in FIGURE 2 can be maintained constant. Thus, an important part of the circuit design is that of the one-shot multi-vibrator 16, output driver 17, and ramp generator 21. These circuits are so designed to provide a substantially absolutely constant volt-second area pulse in response to each of the negative trigger pulses 29 received from the "OR" circuit 15. This portion of the circuit of FIGURE 1 is reproduced in detail in FIGURE 3.

Referring to the circuit of FIGURE 3, there is shown generally in the upper part of the drawing a −12 volt power supply line 34, in the center portion of the drawing a common ground line 35, and in the lower portion of the drawing a +12 volt power supply line 36. The output negative trigger pulses 29 from the "OR" circuit are received in the upper lefthand portion of FIGURE 3 on an input lead 37 connecting to the one-shot multi-vibrator. The one-shot multi-vibrator includes transistors Q10 and Q11, respectively, of the PNP and NPN types. Also included is a current transistor Q12 for providing sufficient supply current to the output driver circuit 17.

As shown in the upper central portion of FIGURE 3, the output from the one-shot multi-vibrator is taken from the collector of Q11 and through lead 38 to the base terminals of output driver transistors Q13 and Q14. These transistors are respectively of the NPN and PNP type with their emitters connected together as shown. The collector terminals of the transistors Q13 and Q14 are clamped at +6 volts and −6 volts, respectively, by Zener diodes D1 and D2. The common emitters connect through an output lead 39 directly to the integrating circuit 18. The lead 20 described in conjunction with the block diagram of FIGURE 1 also connects directly from the output lead 39 to the ramp generator designated generally by the arrow 21 in the lower righthand portion of FIGURE 3.

The ramp generator includes a storage condenser C1 connected to be charged through resistances R3, R4, and R5. R3 may be a potentiometer as shown to adjust the charging time constant of the RC network. As will become clearer as the description proceeds, a discharge path is provided for the storage condenser C1 through a transistor switch Q15, the collector of which is connected to the Zener diode D2 associated with the collector of the output driver transistor Q14.

The reset trigger generator 22 shown in block form in the lower lefthand portion of FIGURE 3 provides the reset trigger pulses 32 on the output lead 23 and through diode D5 to the base of the transistor Q10. Negative voltage for the reset trigger generator is provided from the −12 volt supply line 34 through a lead 40 and positive voltage from line 36 as shown.

Voltage for the output driver transistor Q13 is derived from lead 41 and resistance R1 extending from the +12 volt supply line 36 shown at the lower portion of FIGURE 3. Negative voltage for the other output driver transistor Q14 is provided from the −12 volt line 34 through the resistance R2.

An important feature of the circuit illustrated in FIGURE 3 with respect to the general components set forth constitutes a small capacitance C3 shown at the top portion of FIGURE 3 connecting through a line 42 from the collector terminal of the transistor Q10 to the output line 43 from the integrating circuit 18. The purpose for this capacitance C3 will be set forth as the description proceeds.

In the operation of the circuit of FIGURE 3, prior to receipt of any of the negative trigger pulses 29 shown in the upper lefthand corner, the transistors Q10 and Q11, which constitute part of the feedback loop of the multi-vibrator, are both conducting, the current control transistor Q12 is off or non-conducting, output driver transistor Q13 is off or non-conducting, and output driver transistor Q14 is on or conducting. With transistor Q14 conducting and its collector clamped at −6 volts by the Zener diode D2, the emitter voltage is the same as the collector voltage and therefore the potential on the output line 39 is −6 volts. This same −6 volts exists on lead 20 to the ramp generator circuit 21. Transistor Q15 is off as a consequence of its base terminal connection through resistance R8, diode D3, resistance R7, and line 41 to the +12 volt power supply line 36 in the bottom portion of FIGURE 3. It will also be noted that this base terminal is connected through resistance R6 to the −12 volt power line 34 through the lead 40. However, R6 is much larger than R7 and R8 in series, and therefore the transistor is held off.

If now one of the negative trigger pulses 29 is received on line 37 to the base of the transistor Q11, transistor Q11 is turned off. Turning off of transistor Q11 causes its emitter to tend towards −12 volts. This emitter, as shown, is coupled through condenser C4, which has a relatively large capacitance, to the base of Q12, thereby turning on the current transistor Q12. Power from the positive 12 volt power supply lead 36 in the lower portion of FIGURE 3 passes through lead 44, and diode D4, through the emitter of and collector of Q12 to the junction point 45 between the collector terminal for the transistor Q11 and base terminal for the transistor Q10. The collector of Q12 follows the emitter towards +12 volts and thus the base of Q10 is raised in potential to turn off Q10.

The 12 volt positive potential from the collector Q12 is passed through the lead 38 to turn off Q14 and turn on Q13 in the output driver circuit 17. The common emitter output line 39 is thus raised to +6 volts and held at +6 volts as a consequence of the clamping Zener D1.

The +6 volt amplitude constituting the upper portion of the constant volt-second area pulses, passes through line 20 directly to the charging resistances R3, R4, and R5 for the storage condenser C1. C1 is thus charged from −6 volts towards +6 volts at a rate determined by the time constant made up of the value of the capacitance C1 and the resistances R3, R4, and R5 in the charging path. The various saw-tooth wave forms shown at 31 in FIGURE 2 illustrate the charging voltage change from −6 volts towards +6 volts. This wave form is passed directly through the lead 46 to the reset trigger generator 22.

The reset trigger generator may comprise a simple blocking oscillator biased to generate a negative reset trigger pulse shown at 32 only when the voltage from the capacitor C1 reaches zero. Thus, as the saw-tooth wave form passes through the line 23 and diode D5 to the base of the transistor Q10 to turn on transistor Q10. Q10 will then draw collector current and through the collector lead 47 and coupling capacitor C5 this current will pass to the base of the transistor Q11 to turn on Q11. The collector of Q11 in turn is coupled through the small coupling capacitor C6 to the base of Q10 to provide a regenerative network until both Q10 and Q11 are fully conducting.

The condenser C4 from the emitter of the transistor Q11, as mentioned heretofore, is large and thus Q11 appears as a low impedance. Q12 is thus not immediately turned off but after its storage, will become non-conducting. The voltage at the junction point 45 becomes negative as a consequence of the turning on of Q11 which negative voltage is transmitted directly through the lead 38 to the base of each transistor Q13 and Q14 in the output driver circuit 17. This voltage will switch off Q13 and switch on Q14. It should be noted that this action will take place even though transistor Q12 may still be conducting.

With the output driver transistors Q13 and Q14 switched, the −6 volts will again appear on line 39 demarcing the termination of the constant volt-second area pulse 30.

Referring to the ramp generator 21, the rapid switching from +6 volts to −6 volts of the constant volt-second area pulses received on line 20 is transmitted through differentiating capacitor C2, which differentiates the down side of the pulse to diode D3, thereby turning off this diode. Switching off of diode D3 cuts off the +12 volt supply power from the resistance R7 so that the −12 volt power supply line from R6 to the base of Q15 is applied to switch on the discharging transistor. With the transistor Q15 switched on, the condenser C1 is immediately discharged back to −6 volts. After C1 has been discharged through the transistor Q15, the diode D3 again becomes conducting, and Q15 is then shut off since the resistances R7 and R8 are much smaller than the resistance R6 as described heretofore. All of the various components are thus back in their initial condition and the entire circuit is ready for the reception of another negative trigger pulse 29, at which time the cycle of events set forth above is repeated.

In connection with the foregoing, it should be noted that the one-shot multi-vibrator has been uniquely designed such that the switching time when going from the positive state to the negative state is effected extremely rapidly compared to the switching time when going from the negative state to the positive state. In other words, the multi-vibrator has been designed to optimize the critical time of going from positive to negative at the expense of the non-critical time of going from negative to positive. The reason for this design is to insure an absolutely constant time duration for the constant volt-second area pulses. Since the start of the timing signal from the ramp generator cannot be initiated until the +6 volts is provided on the charge line 20 from the output driver 17, the length of time for the wave form to attain +6 volts from −6 volts is not critical. However, the length of time for the wave form to fall from +6 volts to −6 volts is critical and should be as rapid as possible. By the use of the PNP—NPN transistor pairs Q10 and Q11, the multi-vibrator can switch rapidly into the negative state since neither transistor must come out of saturation. When the multi-vibrator is in the negative state, Q10 and Q11 are both conducting as described. The multi-vibrator will switch out of this state more slowly since both transistors must come out of saturation.

Another important feature of the design is the provision of automatic self-compensation. Since the storage condenser C1 is connected to be charged directly from the +6 volt constant volt-second area pulse, should any drift occur in the +6 volt value determined by the Zener diode D1, for example an increase, the charging time for the condenser C1 will correspondingly be decreased since a higher voltage is applied thereto. Therefore, the reset trigger 32 will be passed more quickly since the charge path will reach zero more quickly and thus terminate the constant volt-second area pulse sooner. Therefore, the product of time duration and amplitude will remain substantially constant by this self-compensating feature. Similarly, it will be understood that should the Zener voltage drift to a value less than +6 volts, the storage condenser C1 will be charged more slowly to again provide the above-noted compensation.

A further feature of the circuit of FIGURE 3 is a compensation for the distributed capacity inherent in the integrating circuit 18. As mentioned before, a line 42 connects from the collector terminal 47 of the transistor Q10 and through a condenser C3 to the output line 43 from the integrating circuit 18. The collector line 47 is out of phase with the voltage at the junction point 45. Therefore, by employing the very small capacitor C3 and feeding the out-of-phase voltage therethrough to the output 43, the distributed capacity within the integrating circuit 18 may be compensated. An improvement of six to eight decibels in the signal-to-noise ratio is realized by this circuit.

It will be noted in the upper righthand portion of the circuit of FIGURE 3 that the output 19 is derived from a potentiometer operating on a resistance R9. The parallel resistances R10 and R11 are temperature compensating resistances and are designed with an extremely large positive temperature co-efficient of resistance to compensate for the change of insertion loss with a change of temperature in the integrating circuit 18.

In the ramp generator portion of the circuit 21, the parallel resistances R4 and R5 also constitute compensating resistances providing a net negative temperature co-efficient of resistance to compensate for a slight positive temperature co-efficient of resistance in the storage condenser C1.

From the foregoing description, it will be evident that the present invention has provided a greatly improved frequency to voltage converting circuit. Further, it will be evident that the various objects set forth have been realized by the circuitry of this invention. Modifications that fall clearly within the scope and spirit of this invention will of course occur to those skilled in the art. The voltage to frequency converting circuit is therefore not to be thought of as limited to the embodiment set forth merely for illustrative purposes.

What is claimed is:

1. A circuit for providing a D.-C. output voltage level proportional to the frequency of an A.-C. input signal, comprising, in combination: means for converting said input signal into a number of constant volt-second area pulses per second proportional to said frequency; means for integrating said pulses to provide said D.-C. output voltage level; means for fixing the amplitude of said constant volt-second area pulses; and means for fixing the time duration of said constant volt-second area pulses, said last-mentioned means being connected to and controlled by said means for fixing the amplitude of said constant volt-second area pulses such that an increase in said amplitude causes a decrease in said time duration and a decrease in said amplitude causes an increase in said time duration whereby the product of said amplitude and time duration is constant.

2. A circuit for providing a D.-C. output voltage level proportional to the frequency of an A.-C. input signal, comprising, in combination: means for converting said input signal into a number of constant volt-second area pulses per second proportional to said frequency; means for integrating said pulses to provide said D.-C. output voltage level; and a compensating condenser connected to said means for converting siad input signal into a number of constant volt-second area pulses and to the output of said means for integrating said pulses to cancel distributed capacity in said last-mentioned means.

3. A circuit for converting an A.-C. input signal of given frequency to a D.-C.output signal of voltage level constituting a function of said given frequency, comprising, in combination: trigger pulse generating means connected to receive said input signal and provide a number of trigger pulses per second proportional to said given frequency; constant pulse generating means connected to said trigger pulse generating means and responsive to said trigger pulses for providing a number of constant volt-second area pulses proportional to said number of trigger pulses; and integrating means connected to said constant pulse generating means for integrating said constant volt-second area pulses to provide said D.-C. output signal, said constant pulse generating means comprising a one-shot multi-vibrator for providing a square wave pulse in response to each of said trigger pulses; driver output means connected to said one-shot multivibrator to receive said square wave pulse and define a constant amplitude voltage therefor; a ramp generator connected to said driver output means for generating a timing signal in response to said constant amplitude voltage; a reset trigger means connected to the output of said ramp generator and to said one-shot multi-vibrator to receive said timing signal and pass a reset trigger pulse in response to said timing signal to said one-shot multivibrator to reset said multi-vibrator and define a constant time duration for said square wave pulse, said driver output means also being connected to said integrating means whereby said constant amplitude voltage and said constant time duration fix the amplitude and time duration of said square wave pulse to define each of said constant volt-second area pulses.

4. A circuit according to claim 3, in which said ramp generator includes a storage condenser; and charging path resistance means connected between said storage condenser and the output of said output driver means whereby said condenser is positioned to be charged through said charging path resistance means directly by said constant volt-second area pulses, said reset trigger means being responsive to a given voltage level attained by said storage condenser to provide said reset trigger so that said time duration of said constant volt-second area pulse is an inverse function of the value of voltage applied to said storage condenser by said constant volt-second area pulse, whereby a self-compensating system is provided in the event said constant amplitude voltage should drift.

5. A circuit according to claim 3, in which said charging path resistance means is characterized by a negative temperature co-efficient of resistance to compensate for a positive temperature co-efficient of resistance in said storage condenser.

6. A circuit according to claim 3, in which the output of said integrating means includes resistance means having a relatively large positive temperature co-efficient of resistance to compensate for insertion loss variations in said integrating means.

References Cited in the file of this patent

UNITED STATES PATENTS

| | | |
|---|---|---|
| 2,716,189 | Ayres | Aug. 23, 1955 |
| 2,756,336 | Christensen | July 24, 1956 |
| 2,878,448 | Maxey | Mar. 17, 1959 |
| 3,028,556 | Duvall | Apr. 3, 1962 |

OTHER REFERENCES

Gillespie Abstract of application Serial Number 685,-589, published O.G. Sept. 25, 1951, 650 O.G. 1195, 1196.